June 22, 1948.

E. G. D. GABBEY 2,443,820

GAUGE FOR MEASURING OR CHECKING THE EFFECTIVE
DIAMETERS OF SCREW THREADS
Filed Aug. 1, 1944

Inventor
ERIC GORDON DOUGLAS GABBEY
By
Haseltine, Lake + Co.
Attorney

Patented June 22, 1948

2,443,820

UNITED STATES PATENT OFFICE 2,443,820

GAUGE FOR MEASURING OR CHECKING THE EFFECTIVE DIAMETERS OF SCREW THREADS

Eric Gordon Douglas Gabbey, Edgware, England

Application August 1, 1944, Serial No. 547,557
In Great Britain October 25, 1943

3 Claims. (Cl. 33—199)

This invention relates to gauges for measuring or checking the effective diameters of screw threads as distinct from means for checking thread form and outside diameters of threads, the latter usually being checked by a micrometer or a snap gauge and the thread form usually being checked by large scale projection. The present invention can be regarded as being based upon what is known as the three wire method of measurement which is used extensively in tool room work for measuring or checking the diameters of screw threads, two straight wires of circular cross section and of known diameter being placed in contact with a screw thread on one side and a third similar wire being placed substantially diametrically opposite the said two wires, in contact with the other side of the thread, the three wires being of such diameter as to touch the thread at points which are on the simple effective diameter thereof and also to extend beyond the full diameter of the thread, measurements being taken with a micrometer over the tops of the three wires and the simple effective diameter being arrived at by calculation. Actually in the present invention only one wire, or a pair of wires, is required, and the invention provides a highly simplified and reliable gauge.

According to this invention a gauge for measuring or checking the effective diameters of screw threads is characterised in that the thread engaging means of the gauge by which the minimum and maximum limits of the diameters of the screws are determined comprises convolutions of wire adapted to engage by means of the successive convolutions the successive grooves of the work on the simple effective diameter of the thread, which may be expressed in terms of pitch diameter.

In order that the invention may be clearly understood and readily carried into effect drawings are appended hereto illustrating embodiments thereof, and wherein—

Figure 1:
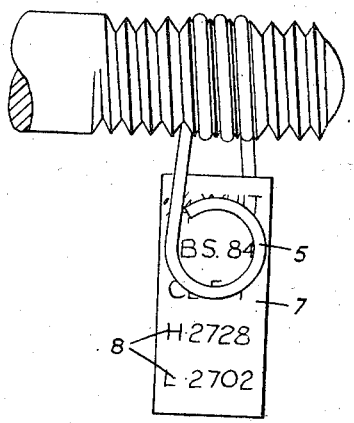
Figure 1 is a side elevation view showing a simple embodiment of the invention being used in gauging the effective diameter of a screw.
Figure 2:
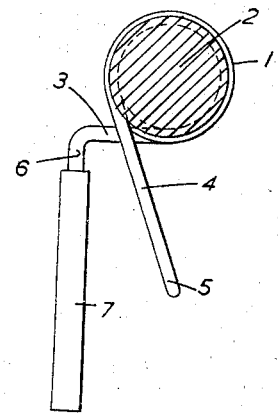
Figure 2 is an end elevation of Figure 1.

Referring to the drawings the gauge comprises a length of wire of known thickness and gauge or diameter wound cylindrically into a resilient helical coil of such diameter that will fit the thread pitch of a screw 2 to be gauged due to the natural resilience of the coil, the ends of the latter being prolonged substantially tangentially to the coil as a whole in opposite or intersecting directions and being bent into two angularly related finger pieces 3 and 4 which can be pressed together by digital pressure to expand the helical coil 1 so that it may receive readily the screw 2 to be gauged.

Figure 3:
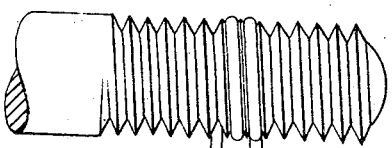
Figure 3 is a side elevation of a modification including an indicator for minimum and maximum limits of the diameters of the screws.
Figure 4:
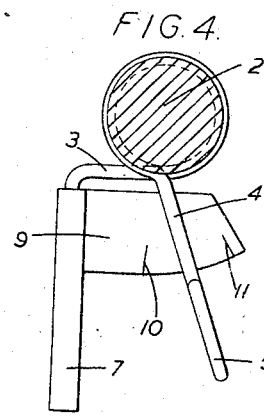
Figure 4 is an end elevation view of Figure 3.

To facilitate manipulating the device the free end of the finger piece 4 is curled into a ring 5 to receive thumb or finger pressure, and the finger piece 3 is cranked as at 6 and joined at its free end to a plate 7 which can be a piece of plastic material or metal, this plate 7 serving as the digital pressure operated member used in conjunction with the ring 5, and also bearing appropriate information such as limit dimensions 8 appropriate to the screws to be gauged. In this connection, as shown in Figures 3 and 4, the plate 7 can carry as an integral or an affixed lateral limb 9 a visual limits gauge element cooperating with the finger piece 4 to indicate whether screws being gauged fall within required minimum and maximum limits. Thus marks 10 and 11 are provided on the limb 9 which are radial in relation to the axis of the coil 1, the finger piece 4 also being substantially radial in relation to such axis.

When the digital pressure is released the coil 1 will, due to its natural resilience grip a screw being gauged tightly so that in effect the individual turns of the coil can be likened to the individual wires in the three wire method of screw gauging, a micrometer reading being taken by the application of a micrometer to the external diameter of the coil 1. In practice the helix need have only a few convolutions, e. g. of the order of three, or the minimum number to allow the coil to be opened by digital pressure without permanent setting of the coil.

It will be understood that the requisite measurements are made against the external diameter of the coil of the gauge when the latter is in position on the appropriate screw; e. g., by the use of a micrometer.

What I claim is:

1. A gauge for use in measuring the effective diameters of screw threads comprising a resilient helical coil of wire which coil is of initially smaller internal diameter than the effective thread diameter of the screw, such wire being of constant diameter, and means to expand said coil of wire to permit a screw thread to be measured to be inserted substantially coaxially in said coil, the successive turns of said coil being adapted on release of said expanding means to contract to engage the flanks of successive turns of the screw thread to be measured.

2. A gauge for use in measuring the effective diameters of screw threads and adapted to be used in accordance with the three wire method of screw gauging, comprising a helical coil of wire which coil is of initially smaller diameter than the effective thread diameter of the screw, such wire being of constant diameter, a finger piece attached to each end of said coil and adapted on the application of digital pressure to both finger pieces to expand said coil of wire to permit a screw thread to be measured to be inserted substantially coaxially in said coil, the natural resiliency of said coil being such that, on release of the digital pressure on said finger pieces the coil will contract to engage successive turns of the screw thread to be measured, and indicator means associated with said finger pieces and adapted visually to show if the diameter of the screw to be measured falls within given limits.

3. A gauge for use in measuring the effective diameters of screw threads comprising a resilient helical coil of wire, which coil is of initially less internal diameter than the pitch diameter of the screw and having a number of turns of the order of three, such wire being of constant diameter, and end portions of said coil extending substantially tangentially therefrom and crossing one another; finger pieces associated with said end portions and adapted, on the application of digital pressure thereto to urge them together to expand said coil of wire to permit a screw thread to be measured to be inserted coaxially in said coil, the successive turns of said coil being adapted on release of the digital pressure on said finger pieces to engage the flanks of successive turns of the screw thread to be measured.

ERIC GORDON DOUGLAS GABBEY.

REFERENCES CITED

The following references are of record in the file of this patent:

UNITED STATES PATENTS

| Number | Name | Date |
|---|---|---|
| 1,851,283 | Johnson | Mar. 29, 1932 |
| 1,875,726 | Hartness | Sept. 6, 1932 |
| 1,986,729 | Johnston | Jan. 1, 1935 |

FOREIGN PATENTS

| Number | Country | Date |
|---|---|---|
| 257,498 | Germany | Mar. 8, 1913 |
| 575,978 | Germany | May 5, 1933 |